United States Patent [19]

Baney

[11] 3,723,497

[45] Mar. 27, 1973

[54] SILICONE COMPOSITIONS CATALYZED WITH PLATINUM II DIACETYLACETONATE

[75] Inventor: Ronald H. Baney, Midland, Mich.

[73] Assignee: Dow Corning Corporation, Midland, Mich.

[22] Filed: Nov. 19, 1971

[21] Appl. No.: 200,619

[52] U.S. Cl...260/46.5 UA, 117/135.1, 260/33.8 SB, 260/37 SB, 260/46.5 G, 260/46.5 P, 260/825
[51] Int. Cl............................................C08f 11/04
[58] Field of Search.....260/46.5 UA, 46.5 G, 46.5 P, 260/825, 37 SB

[56] References Cited

UNITED STATES PATENTS

| | | | |
|---|---|---|---|
| 3,188,299 | 6/1965 | Chalk | 260/46.5 |
| 3,192,181 | 6/1965 | Moore | 260/46.5 |
| 3,220,972 | 11/1965 | Lamoreaux | 260/46.5 |
| 3,304,259 | 2/1967 | Wright | 252/49.6 |
| 3,383,356 | 5/1968 | Nielsen | 260/46.5 |
| 3,419,593 | 12/1968 | Willing | 260/448.2 |
| 3,532,649 | 10/1970 | Smith et al. | 260/18 |
| 3,470,225 | 9/1969 | Knorre et al. | 260/448.2 |

*Primary Examiner*—Donald E. Czaja
*Assistant Examiner*—Melvyn I. Marquis
*Attorney*—Robert F. Fleming, Jr. et al

[57] ABSTRACT

A curable organosilicon composition is prepared by mixing an organosilicon polymer containing aliphatic unsaturation, an organosilicon compound containing silicon-bonded hydrogen atoms and platinum II diacetylacetonate. The catalyzed composition remains uncurved over extended periods of time but can be cured to a rubber or a resinous product in a short period of time by heating.

13 Claims, No Drawings

SILICONE COMPOSITIONS CATALYZED WITH PLATINUM II DIACETYLACETONATE

This invention relates to a platinum catalyzed curable silicone composition.

Silicone compositions catalyzed with platinum and platinum compounds are well known in the art. These platinum catalyzed silicone compositions comprise an organosilicon compound with aliphatic unsaturation and an organosilicon compound with silicon-bonded hydrogen atoms. These silicone compositions immediately begin curing upon the mixing of the ingredients and reach a gel state within a few hours to at most one day at room temperature. For this reason, the platinum catalyzed silicone compositions have been made and sold as two package systems wherein the contents of the two packages were mixed just prior to use. A means to provide a platinum catalyzed system which could be stored in one package for an extended period of time has been achieved by a number of techniques, all of which involve the use of inhibitors for the platinum catalyst. These inhibitors retard the curing of the platinum catalyzed systems at room temperature but can be readily cured by heating the composition.

The platinum catalyst inhibitor systems can be illustrated by the inhibitor and include the aromatic heterocyclic nitrogen compounds, pyridazine, pyrazine, quinoline, 2,2'-biquinoline, bipyridine, naphthyridine, quinaldine, dialkyl formamides, thioamides, alkylthioureas and ethylene thiourea as described in U.S. Pat. No. 3,188,299, the organophosphorus compounds as described in U.S. Pat. No. 3,188,300, benzotriazole as described in U.S. Pat. No. 3,192,181, the nitrile compounds as described in U.S. Pat. No. 3,344,111, the halocarbons described in U.S. Pat. No. 3,383,356, the acetylenic compounds described in U.S. Pat. No. 3,445,420, the vinyl silazanes described in U.S. Pat. No. 3,453,233, the sulfoxide compounds described in U.S. Pat. No. 3,453,234 and the stannous salts, the mercuric salts, the bismuth (+3) salts, the cuprous salts and the cupric salts described in U.S. Pat. No. 3,532,649. These patents cited above are hereby incorporated by reference to include the methods of using the platinum catalyst inhibitors and the specific platinum catalyst inhibitors.

The use of inhibitors is not the most convenient means for obtaining the desired results. When an inhibitor is used, the amounts of inhibitor as well as the platinum catalyst must be added in specific amounts to achieve a certain desired result. For example, the degree of stability of a catalyzed system depends upon the type of inhibitor, the amount of inhibitors, the type and amount of platinum catalyst and the system being catalyzed. It is inconvenient and sometimes extremely difficult to select the proper platinum catalyst, inhibitor and silicone components in the correctly metered proportions to give the desired result.

Unexpectedly, a curable silicone system has now been made which provides a control of the cure at room temperature. This curable silicone system is the subject of my present invention.

It is therefore an object of the present invention to provide a platinum catalyzed curable silicone system which does not cure spontaneously at room temperature in a short time. This object and others will become more apparent in the following detailed description.

This invention relates to a curable organosilicon composition which is prepared by mixing ingredients comprising (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms, (2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4, and (3) platinum II diacetylacetonate.

Organosilicon compound (1) can be a resin, a fluid or a substantially non-flowing high polymer such as conventionally used in silicone rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and myricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl, ethynyl, butadienyl, cyclopentenyl, m-vinylphenyl and the like.

Any monovalent halohydrocarbon radical and cyanoalkyl radical can be used in (1), and include, for example, chloromethyl, 3,3,3-trifluoropropyl, 2,3-dibromocyclopentyl, iodophenyl, dichloronaphthyl, 2-cyanoethyl, 2-cyanopropyl, and omega-cyanooctadecyl.

In component (1) there must be an average per molecule of at least two radicals containing aliphatic unsaturation. These radicals enter into the curing reaction discussed below. More than two said radicals can be present, but a minimum of two (average per molecule) is necessary to obtain a cure to a coherent solid. When the average number of aliphatically unsaturated radicals per molecule is more than two, a correspondingly tighter cure is obtained.

The monovalent organic radicals in (1) can be the same or different. In addition, the aliphatically unsaturated radicals can be the same or different. As well, organosilicon compound (1) can be a copolymer, mixture of copolymers, mixtures of monomers and polymers, mixtures of monomers and copolymers and the like.

The remaining valences of the silicon atoms in organosilicon compound (1) are satisfied by divalent oxygen, divalent hydrocarbon radicals, divalent hydrocarbon ether radicals and divalent haloarylene radicals. Any one or more of the said divalent linkages can be present in component (1).

Examples of divalent radicals that can be used in component (1) include, for example, hydrocarbon radicals such as

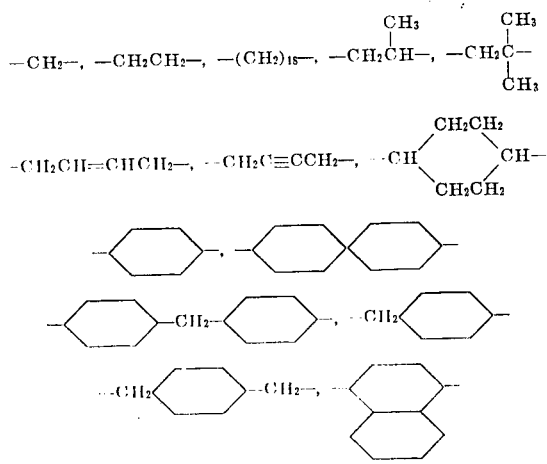

and

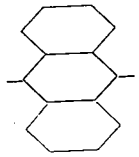

hydrocarbon ether radicals such as $-CH_2CH_2OCH_2CH_2-$, $-CH_2CH_2CH_2OCH_2CH_2-$ and

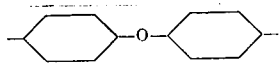

and haloarylene radicals such as

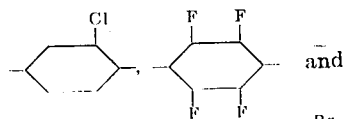 and

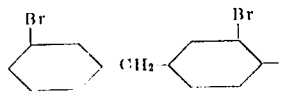

Any of the divalent linkages stated above can be present in component (1). However, where the average number of silicon atoms per molecule is greater than three, it is preferred when use of the finished product will include both extremely high and extremely low temperature exposure, that at least 50 percent of the divalent linkages be oxygen. This is not necessary, however, particularly when component (1) is a cyclic material.

Preparation of materials that can be component (1) are well known in the art. The monovalent radicals can be attached for instance, by either the so-called "direct process," or via Grignard reactions, or in some cases by a pseudo Friedel-Crafts reaction. Other reactions normally used to introduce organic radicals can, of course, be also used. Silicon-bonded oxygen is introduced by hydrolysis of a hydrolyzable group on silicon (such as halogen, alkoxy or acyloxy) as is well known in the art. Divalent organic radicals can be introduced via Wurtz-type synthesis, Grignard, direct process, etc. The preparations of compounds suitable for use as component (1) are well known in the art and need not be recited herein.

Organosilicon compound (2) can be any organosilicon compound having silicon-bonded hydrogen atoms. It can contain two or more silicon-bonded hydrogen atoms per molecule and in addition an average of up to two monovalent radicals per silicon atom as above set forth. These can include, for example, alkyl radicals such as methyl, ethyl, isopropyl, tert-amyl, octadecyl and myricyl; cycloalkyl radials such as cyclopentyl and cyclohexyl; aralkyl radicals such as benzyl, $\beta$-phenylethyl and xylyl; and aryl radicals such as phenyl, tolyl, xenyl, naphthyl and anthracyl. In addition, monovalent halohydrocarbon radicals such as chloromethyl, 3,3,3-trifluoropropyl, $\alpha,\alpha,\alpha$-trifluorotolyl, bromophenyl and 2,3-dibromocyclopentyl can be present in component (2). Also, cyanoalkyl radicals such as cyanoethyl and cyanobutyl can also be present. The organic radicals can be alike or different. Component (2) can be a homopolymer, a copolymer, a monomer or mixture of two or more of the foregoing, provided only that each is free of aliphatic unsaturation and each contain an average per molecule of at least two silicon-bonded hydrogen atoms.

The remaining valences of the silicon atoms of component (2) are satisfied from divalent oxygen, divalent hydrocarbon radicals free of aliphatic unsaturation (e.g. $-CH_2-$, $-(CH_2)_{18}-$, $-CH_2CH(CH_3)-$, $-CH_2C(CH_3)C2-$,

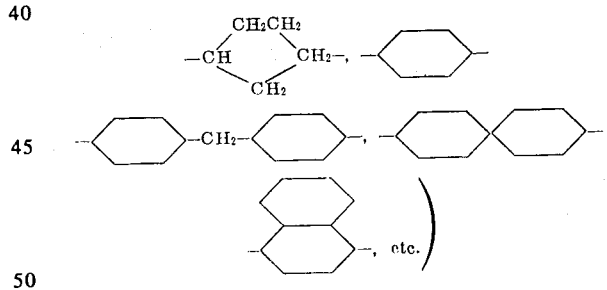

divalent hydrocarbon ether radicals free of aliphatic unsaturation (e.g. $-CH_2CH_2OCH_2CH_2-$, $-CH_2CH_2CH_2OCH_2CH_2-$,

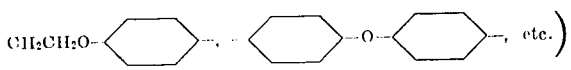

and divalent haloarylene radicals

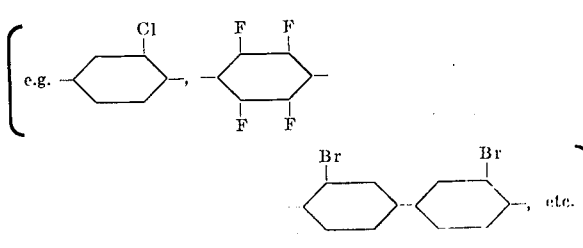

Any one or more of the above said divalent linkages can be present in component (2). As with component (1), when the average number of silicon atoms per molecule of (2) is greater than three it is preferred that at least 50 percent of the above divalent linkages be oxygen. This is not necessary, however, especially when component (2) is a cyclic material.

Preparation of materials that come within the definition of component (2) are well known in the art, and many examples of such materials are available commercially. Thus, recitation of methods of manufacture of these materials would be redundant herein.

The selection of components (1) and (2) is somewhat interrelated. When the average number of aliphatically unsaturated groups per molecule in component (1) is 2.0, a component (2) should be selected wherein the average number of silicon-bonded hydrogen atoms per molecule is at least 2.0, so that the total of these just defined quantities is at least 4. The analogous is true when the chosen component (2) contains 2.0 (average) silicon-bonded hydrogen atoms per molecule. When either component has the defined quantity greater than 2.0, selection of the other component on this basis is irrelevant. It should be understood, of course, that the higher the sum of these quantities, the more highly crosslinked can be the cured composition.

The molar ratio of aliphatic unsaturated radicals in (1) to the silicon-bonded hydrogen atoms in (2) can in some cases be an important consideration. Where it is important, the ratio of these two should be preferably between 0.67 and 4.0. However, there are many instances wherein a balance of these two quantities is unimportant. For example, if a component (1) has, say, an average of six aliphatic unsaturated groups per molecule, the use of equal molar amounts of silicon-bonded hydrogen atoms may well give a cure too highly crosslinked for the desired end use. Thus, less than, sometimes much less than, the equal molar amount of SiH would be used to provide the desired degree of cure. However, when maximum stability is required it is desirable to match the molar quantities of silicon-bonded hydrogen atoms in (2) to the aliphatic unsaturated radicals in (1).

Where one desires resinous materials, one can select a resinous component for (1) or (1) and (2) both. By resinous components for (1) and (2), it is to be understood that the average number of organic groups per silicon atom is less than about 1.9. However, one can also select an organosilicon polymer (1) in which the average number of organic groups per silicon atom is greater than 1.9, but wherein the average number of radicals per molecule in (1) having aliphatic unsaturation is greater than 2 and likewise the number of silicon-bonded hydrogen atoms per molecule in (2) is also greater than 2 such that the final product will be highly crosslinked (resinous).

Where one desires elastomeric type products, one can select for component (1) a linear organosilicon polymer having an average number of organic groups per molecule of about 2 wherein the number of radicals having aliphatic unsaturation is sufficient to provide low crosslink densities such that with the organosilicon compound (2) which usually has more than two silicon-bonded hydrogen atoms per molecule the final product is elastomeric when cured. The selection of components (1) and (2) to provide either resinous or elastomeric or gel-like products is well within the skill of a worker in the art of silicone chemistry. Variations of the different combinations of (1) and (2) can be illustrated by reference to U.S. Pat. No. 3,020,260, U.S. Pat. No. 3,249,581, U.S. Pat. No. 3,284,406, U.S. Pat. No. 3,595,934 and U.S. Pat. No. 3,433,760 as well as the patents cited above which include the inhibitors. All these patents are hereby incorporated by reference to illustrate the various unsaturated organosilicon polymers (1) and the organosilicon compounds having silicon-bonded hydrogen atoms (2) and their combinations to provide resins, elastomers and gel-like products.

Component (3) is platinum II diacetylacetonate,

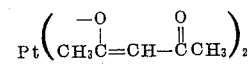

Platinum II diacetylacetonate is available commercially. The amount of platinum II diacetylacetonate should be present in an amount of at least 0.1 part by weight platinum per million parts by weight of composition and preferably at least 1 part by weight of platinum per million parts by weight of composition. Platinum II diacetylacetonate when mixed with (1) and (2) provides a catalyzed system which is stable at room temperature up to 60 days or more depending upon the amount of platinum used but will cure rapidly when heated. Heretofor, platinum catalysts were considered as inducing cure spontaneously upon being mixed with a combination of (1) and (2) and to avoid this spontaneous curing, inhibitors were used. However, now with the use of platinum II diacetylacetonate, a catalyzed mixture of (1) and (2) can be used over periods of up to 60 days without fear of curing. These catalyzed systems will still cure within a short period of time such as less than 30 minutes at 150° C. and usually within 5 to 15 minutes. Thus, the use of platinum II diacetylacetonate will extend pot life to commercially acceptable times without loss of curing at higher temperatures and without the necessity of using platinum catalyst inhibitors.

The components of this invention can be mixed in any order. Whereas the addition of other platinum catalysts to a mixture of (1) and (2) caused interaction immediately even at room temperature, and the order of addition became important. The use of platinum II diacetylacetonate does not suffer from this disadvantage, since all the ingredients can be mixed without any undesirable interaction taking place for days. Thus, the order of mixing is not significant. However, for exceptionally long periods of storage, it is recommended that all three components not be mixed unless an inhibitor is present. For storage purposes, one can package a mixture of components (1) and (3) in one package and (2) in another package. For best results, the compositions of the present invention should not be stored in glass containers or in contact with glass. Since the components are activated by heat, heat should be avoided unless cure is desired. Storage of a mixture of (2) and (3) alone is usually not preferred, since moisture could cause undesirable reaction.

The curing reaction is that of addition of an SiH of (2) to an unsaturated radical on silicon of (1). This is a well-known reaction, catalyzed by many other materials in addition to platinum. The addition of SiH to allyl on silicon serves to illustrate the reaction as follows:

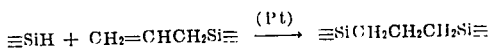

It is noteworthy that no by-products are formed in the curing reaction. Thus, it is not necessary to cure the system under pressure as is the case when a curing system produces by-products which are volatile. Further, it is unnecessary to carefully postbake the cured composition, as is necessary with most other heat activated curing systems now used in silicones. It is already well known that a curing system involving SiH and aliphatic unsaturated radicals need not be employed in a closed system. It is also well recognized that neither the extent of cure nor rate of cure are inhibited by air or components thereof.

In addition to the recited components, other materials can be present in a composition utilizing this curing catalyst system. Such materials as are ordinarily used in organosilicon compositions, such as filler, (4), (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should of course be excluded, but these are not normally included in organosilicon compounds designed to be cured by heat activated curing catalysts.

The instant composition can be used for any application requiring a resin or rubber where extended pot life is useful and heat activated curing is possible. One will immediately recognize the tremendously wide variety of applications herein included. The instant curing system can be activated in closed or open systems, in thin or thick sections and under pressure and at atmospheric pressure with equal ease merely by the application of heat, there being complete freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibition, and therefore uniform cure throughout the sample. In addition, the use of platinum II diacetylacetonate in the present composition improves the addition of the cured product to substrates particularly metals such as aluminum. This is particularly useful where the compositions are resinous.

For elastomeric products particularly useful curable organosilicon compositions are those having 45 to 75 inclusive weight percent of (1), 0.5 to 10 inclusive weight percent of (2), 20 to 50 inclusive weight percent of a filler, (4), where the weight percentages are based on the combined weights of (1), (2) and (4) and platinum II diacetylacetonate.

For resinous products, the curable organosilicon composition preferably has as component (1), an organosilicon resin which is composed of monoorganosiloxane units, diorganosiloxane units and triorganosiloxane units such that the average number of organic groups per silicon atom is less than 1.9. The preferred siloxane units of the organosilicon resin include monomethylsiloxane, monophenylsiloxane, dimethylsiloxane, trimethylsiloxane and methylvinylsiloxane.

The following examples are illustrative only and should not be construed as limiting the present invention which is properly delineated in the claims.

EXAMPLE 1

Curable organosilicon compositions were prepared by first making two mixtures wherein mixture (A) contained vinyl unsaturation in a polydimethylsiloxane and mixture (B) contained an organosilicon compound having silicon-bonded hydrogen atoms.

Mixture (A) contained 46 parts by weight of a methylphenylvinylsiloxy endblocked polydimethylsiloxane having a viscosity of 400 cs. at 25° C., 40 parts by weight 5 micron quartz filler, 12.0 parts by weight trimethylsiloxy endblocked polydimethylsiloxane having a viscosity of 20 cs. at 25° C., 0.5 parts by weight of lampblack and 1 part by weight of zinc oxide.

Mixture (B) contained 41 parts by weight of a methylphenylvinylsiloxy endblocked polydimethylsiloxane having a viscosity of 400 cs. at 25° C., 41 parts by weight of 5 micron quartz filler, 12.5 parts by weight of trimethylsiloxy endblocked polydimethylsiloxane having a viscosity of 20 cs. at 25° C. and 5.5 parts by weight of a polyorganosiloxane having 20 mol percent trimethylsiloxy units, 30 mol percent dimethylsiloxane units and 50 mol percent methylhydrogensiloxane units.

A mixture of 0.8 parts by weight platinum II diacetylacetonate and 100 parts by weight toluene was prepared and varying amounts of this solution as shown in Table I was added to mixture (A) and mixture (A) and (B) were then mixed in a 1 to 1 weight ratio. After (A) and (B) were mixed the pot life was determined by observing the time necessary to gel at room temperature and the time to gel at 150° C. was determined by placing samples in a 150° C. air circulating oven. All the samples cured to an elastomer.

TABLE I

| Platinum II Diacetylacetonate Solution Added, Parts by Weight | Pot Life, Days | Gel Time Minutes |
|---|---|---|
| 0.1 | >60 | 30 |
| 0.2 | 30 | 22 |
| 0.3 | 24 | 19 |
| 0.4 | 20 | 14 |
| 0.8 | 14 | 7 |

EXAMPLE 2

To mixture (A) of Example 1, 0.6 parts by weight of a solution of 0.8 parts by weight platinum II in 100 parts by weight chlorothene was added. This mixture was then mixed in a 1 to 1 weight ratio with mixture (B)

of Example 1 to provide a mixture which had a 7.4 poise viscosity. This curable organosilicon composition had a pot life of greater than 30 days at room temperature and a gel time of 7 minutes at 150° C. After 20 minutes at 150° C., the cured elastomer had a durometer of 26 on the Shore A scale.

EXAMPLE 3

To mixture (A) of Example 1, 0.6 parts by weight of the solution of platinum II diacetylacetonate defined in Example 2 was added. Another mixture of 47.25 parts by weight of methylphenylvinylsiloxy endblocked polydimethylsiloxane having a viscosity of 400 cs. at 25° C., 47.25 parts by weight of 5 micron quartz filler and 5.50 parts by weight of a trimethylsiloxy endblocked polymethylhydrogensiloxane having a viscosity of about 30 cs. at 25° C. was prepared and this mixture was mixed with the above catalyzed mixture in a 1 to 1 weight ratio. The pot life of the resulting curable organosilicon composition was greater than 14 days and the gel time was 6 minutes at 150° C. The durometer of the cured elastomer after 10 minutes at 150° C. was 55 on the Shore A scale.

EXAMPLE 4

The following composition was prepared by mixing 63 parts by weight of a methylphenylvinylsiloxy endblocked polydimethylsiloxane having a viscosity of 400 cs. at 25° C., 30 parts by weight of five micron quartz filler and 5 parts by weight of a polyorganosiloxane having 20 mol percent trimethylsiloxane units, 30 mol percent dimethylsiloxane units and 50 mol percent methylhydrogensiloxane units. To four portions of 98 parts by weight each of this mixture various platinum catalysts were added to make curable organosilicon compositions. To portion A, 0.15 parts by weight of a soluble platinum catalyst and 0.08 parts by weight of cyclic methylvinylsiloxanes. This soluble platinum catalyst was prepared by reacting chloroplatinic acid with a methylphenylvinylsiloxane endblocked polydimethylsiloxane fluid in accordance with U.S. Pat. No. 3,419,593, wherein the soluble platinum catalyst had about 0.7 weight percent platinum. To portion B, 0.2 parts by weight of an inhibited platinum catalyst was added. This inhibited platinum catalyst was prepared by mixing 100 parts by weight of the reaction product of chloroplatinic acid, tetramethyldisiloxane and tetramethyldivinyldisiloxane and 5 parts by weight stannous octoate in accordance with U.S. Pat. No. 3,532,649, wherein the inhibited platinum catalyst had about 0.4 weight percent platinum. Portion C was catalyzed by adding 0.2 part by weight of the soluble platinum catalyst as defined for portion A above and 0.1 part by weight of methylbutynol in accordance with U.S. Pat. No. 3,445,420. To portion D, 0.3 parts by weight of platinum II diacetylacetonate solution as defined in Example 2 was added. Portions A, B and C were prepared for comparative purposes. The pot life at room temperature, the gel time at 150° C., the durometer on the Shore A scale, the tensile strength at break and the elongation at break were determined and were shown in Table II.

TABLE II

| Portion | Pot Life | Gel Time Min. | Durometer | Tensile Strength, psi. | Elongation, % |
|---|---|---|---|---|---|
| A | 2 hours | 3 | 35 | 250 | 100 |
| B | 30 days | 5 | 3 | 250 | 100 |
| C | 30 days | 3 | 35 | 250 | 100 |
| D | 30 days | 8 | 35 | 250 | 100 |

EXAMPLE 5

An organosilicon resin having 15 mol percent monomethylsiloxane units, 30 mol percent monophenylsiloxane units, 30 mol percent dimethylsiloxane units, 20 mol percent methylvinylsiloxane units and 5 mol percent trimethylsiloxane units was mixed with $C_6H_5Si[OSi(CH_3)_2H]_3$ in amounts to provide one silicon-bonded hydrogen atom per vinyl radical in the resin. This mixture was catalyzed with platinum II diacetylacetonate to provide 10 parts by weight platinum per million platinum per by weight mixture. The gel time was determined at various temperatures as shown in Table III.

TABLE III

| Temperature, °C. | Gel Time |
|---|---|
| 25 | 10 days |
| 50 | 990 minutes |
| 75 | 95 minutes |
| 100 | 15 minutes |
| 125 | 8 minutes |
| 150 | 5 minutes |
| 175 | 3.5 minutes |

The cured resin showed exceptional adhesion to the aluminum cups in which they were cast.

That which is claimed is:

1. A curable organosilicon composition which is prepared by mixing ingredients comprising
   1. an organosilicon polymer having an average of from one to three organic groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms,
   2. an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4, and platinum II diacetylacetonate in an amount of at least 0.1 part by weight platinum per million parts by weight of composition.

2. The curable organosilicon composition according to claim 1 wherein (1) is a triorganosiloxy endblocked polydiorganosiloxane having a viscosity of at least 100 cs. at 25° C. and in which the organic groups are defined in claim 1.

3. The curable organosilicon composition according to claim 1 wherein (1) has olefinic unsaturation.

4. The curable organosilicon composition according to claim 2 wherein (1) has olefinic unsaturation.

5. The curable organosilicon composition according to claim 2 wherein the organic groups of (1) are methyl, phenyl and vinyl.

6. The curable organosilicon composition according to claim 2, wherein the organic groups of (1) are methyl, 3,3,3-trifluoropropyl and vinyl.

7. The curable organosilicon composition according to claim 1 in which (1) is an organosilicon resin composed of monoorganosiloxane units, diorganosiloxane units and triorganosiloxane units such that the average number of organic groups per silicon atom is less than 1.9 and wherein the organic groups are defined in claim 1.

8. A curable organosilicon composition according to claim 7 in which the organosilicon resin is composed of monomethylsiloxane units, monophenylsiloxane units, dimethylsiloxane units, trimethylsiloxane units and methylvinylsiloxane units.

9. The curable organosilicon composition according to claim 4 wherein (1) is present in an amount of from 45 to 75 inclusive weight percent based on the combined weight of (1), (2) and (4), (2) is present in an amount of from 0.5 to 10 inclusive weight percent based on the combined weight of (1), (2) and (4) and (4), a filler, is present in an amount of from 20 to 50 inclusive weight percent based on the weight of (1), (2) and (4).

10. The curable organosilicon composition according to claim 5 wherein (1) is present in an amount of from 45 to 75 inclusive weight percent based on the combined weight of (1), (2) and (4), (2) is present in an amount of from 0.5 to 10 inclusive weight percent based on the combined weight of (1), (2) and (4), (4), a filler, is present in an amount of from 20 to 50 inclusive weight percent based on the weight of (1), (2) and (4).

11. The curable organosilicon composition according to claim 6 wherein (1) is present in an amount of from 45 to 75 inclusive weight percent based on the combined weight of (1), (2) and (4), (2) is present in an amount of from 0.5 to 10 inclusive weight percent based on the combined weight of (1), (2) and (4) and (4), a filler, is present in an amount of from 20 to 50 inclusive weight percent based on the combined weight of (1), (2) and (4).

12. A method for curing an organosilicon composition comprising
A. mixing
1. an organosilicon polymer having an average of from one to three organic groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms,
2. an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4, and
3. platinum II diacetylacetonate in an amount of at least 0.1 part by weight platinum per million parts by weight of composition, and
B. heating the resulting mixture of (A), above 100° C., whereby a coherent solid is obtained.

13. The method for curing an organosilicon composition according to claim 12 wherein (1) is a triorganosiloxy endblocked polydiorganosiloxane having a viscosity of at least 100 cs. at 25° C. and in which the organic groups are defined in claim 12.

* * * * *